G. UNDERHILL.
Spring-Motor.
No. 196,503. Patented Oct. 23, 1877.
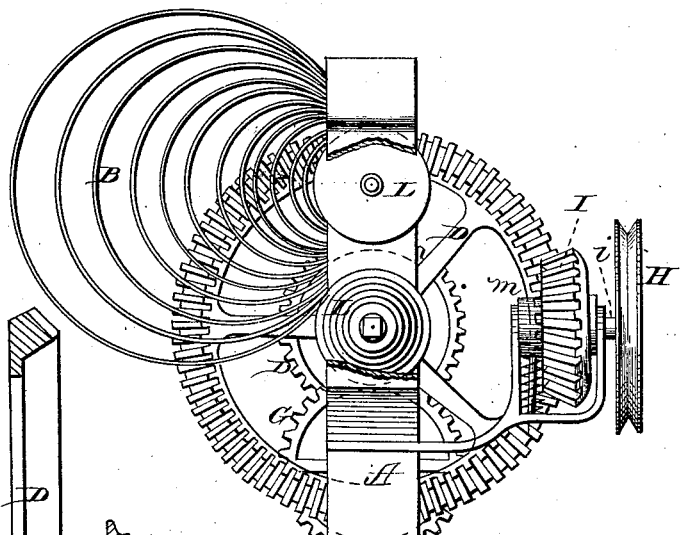
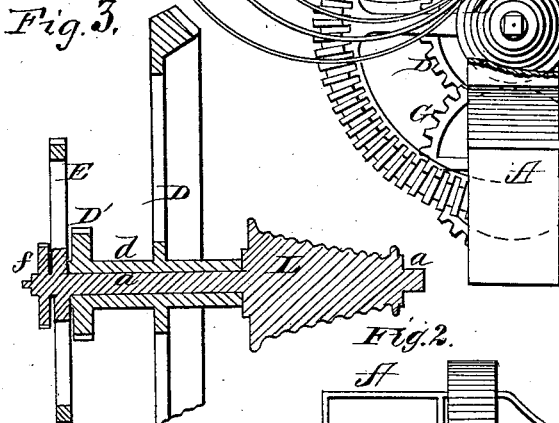
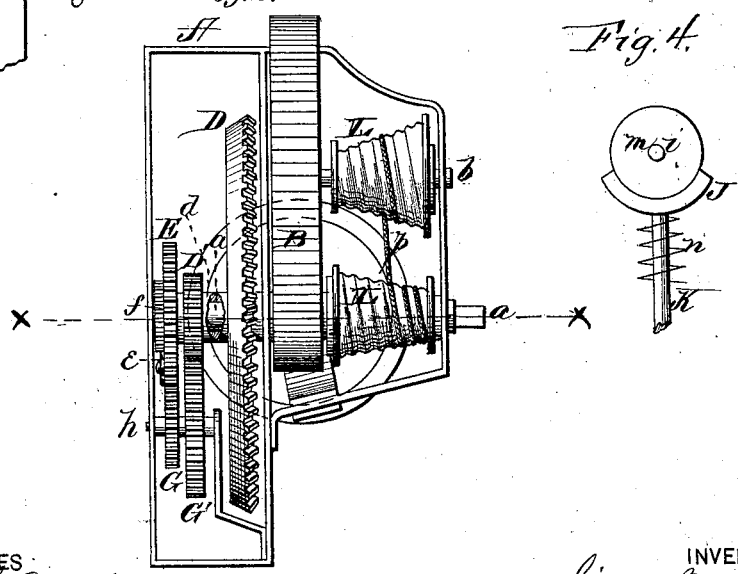
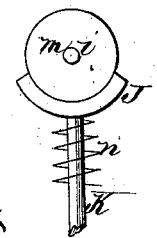
WITNESSES
Franck L. Ouraud
Frank Galt
INVENTOR
Gilbert Underhill
Alexander Mason
ATTORNEYS

UNITED STATES PATENT OFFICE.

GILBERT UNDERHILL, OF PHILADELPHIA, PENNSYLVANIA.

IMPROVEMENT IN SPRING-MOTORS.

Specification forming part of Letters Patent No. 196,503, dated October 23, 1877; application filed September 12, 1877.

*To all whom it may concern:*

Be it known that I, GILBERT UNDERHILL, of Philadelphia, in the county of Philadelphia, and in the State of Pennsylvania, have invented certain new and useful Improvements in Motors for Sewing-Machines; and do hereby declare that the following is a full, clear, and exact description thereof, reference being had to the accompanying drawings, and to the letters of reference marked thereon, making a part of this specification.

The nature of my invention consists in the construction and arrangement of a motor for sewing-machines, as will be hereinafter more fully set forth.

In order to enable others skilled in the art to which my invention appertains to make and use the same, I will now proceed to describe its construction and operation, referring to the annexed drawing, in which—

Figure 1 is a front view of my improved sewing-machine motor. Fig. 2 is a side view of the same. Fig. 3 is a longitudinal section through the line $x\ x$, Fig. 2. Fig. 4 is a view of the brake.

A represents a frame-work of suitable construction to contain the various operating parts. In this frame are two shafts or arbors, $a$ and $b$, running parallel with each other. The shaft $a$ is the winding-arbor, and runs entirely through the frame, while the shaft $b$ runs only partially through the frame, and has the operating spring B wound around it, one end of said spring being secured to said shaft, while the other end is fastened to the frame. The winding-arbor $a$ passes for a portion of its length through a sleeve, $d$, as shown, upon which sleeve are secured a pinion, D′, and a large bevel-gear wheel, D. At the rear end of the sleeve $d$, and loosely upon the arbor $a$, is placed a cog-wheel, E, connected to said arbor by a pawl, $e$, and ratchet-wheel $f$. The cog-wheel E meshes with a small cog-wheel or pinion, G, secured upon a short arbor, $h$, upon which is also secured a larger cog-wheel, G′, and this meshes with the pinion D′ upon the sleeve $d$, so that by these means a very rapid motion is imparted to the cogged periphery or rim of the wheel D from the shaft $a$. This bevel-gear wheel D meshes with a small bevel-pinion, I, upon a short arbor, $i$, which arbor also carries the band-pulley H, so that thereby a still more rapid motion is imparted to the band-pulley. This pulley is to be, by a belt, connected with the band-wheel of the sewing-machine to which the motor is attached. On the shaft $i$ is further secured a collar or small wheel, $m$, under which is placed a curved brake-shoe, J, provided with a stem, K. This stem is surrounded by a spring, $n$, which presses the brake up against the wheel $m$ to stop the motor. The stem or rod K is intended to be connected to a treadle or foot-lever to be operated by the foot, so as to withdraw the brake more or less from the wheel $m$, and thus start the motor, and also regulate the speed thereof.

The device for communicating motion from the spring-arbor $b$ to the winding-arbor $a$ is as follows: Upon these two arbors are secured two tapering or conical pulleys, L L, of the same size, but placed in opposite directions, and connected by a cord or chain, $p$, wound around them. These pulleys, being of proper taper and of the same size, act as varying levers, and it will readily be seen that an equal force of the spring is obtained all the way.

It will be noticed that, by the arrangement of the gearing as described, the sleeve $d$ and shaft $a$ within it both rotate in the same direction, thus reducing friction.

Having thus fully described my invention, what I claim as new, and desire to secure by Letters Patent, is—

1. The combination of the shaft $a$ with gear E, the sleeve $d$ surrounding said shaft, and provided with gears D D′, and the idle-gears G G′, all arranged, as described, for increasing the speed and causing the shaft and sleeve to rotate in the same direction, as herein set forth.

2. The combination of the winding-arbor $a$ with gear E, shaft $b$, coil-spring B, conical or tapering pulleys L L, placed on the shafts $a$ $b$ in opposite directions, cord $p$, sleeve $d$, with gears D D′, and idle-gears G G′, all constructed and arranged to operate substantially as and for the purposes herein set forth.

In testimony that I claim the foregoing I have hereunto set my hand this 31st day of August, 1877.

GILBERT UNDERHILL.

Witnesses:
 WILLIAM S. TOLAND,
 ELWOOD A. COLLINS.